United States Patent
Araujo Pedroso et al.

(10) Patent No.: US 12,051,975 B2
(45) Date of Patent: Jul. 30, 2024

(54) THREE-LEVEL BOOST CONVERTER TO MAINTAIN A ZERO-VOLTAGE SWITCHING CONDITION AT AN OUTPUT THEREOF

(71) Applicant: Collins Aerospace Ireland, Limited, Cork (IE)

(72) Inventors: Douglas Araujo Pedroso, Cork (IE); Ignacio Castro Álvarez, Cork (IE)

(73) Assignee: Collins Aerospace Ireland, Limited, Cork (IE)

( * ) Notice: Subject to any disclaimer, the term of this patent is extended or adjusted under 35 U.S.C. 154(b) by 298 days.

(21) Appl. No.: 17/475,269

(22) Filed: Sep. 14, 2021

(65) Prior Publication Data
US 2023/0080527 A1 Mar. 16, 2023

(51) Int. Cl.
*H02M 3/158* (2006.01)
*B60L 15/00* (2006.01)
*H02M 1/00* (2006.01)

(52) U.S. Cl.
CPC .......... *H02M 3/158* (2013.01); *B60L 15/007* (2013.01); *H02M 1/0058* (2021.05); *B60L 2210/14* (2013.01)

(58) Field of Classification Search
CPC .. H02M 3/158; H02M 3/1588; H02M 1/0058; H02M 1/0095; H02M 1/38; H02M 7/487; B60L 15/007; B60L 2210/14; Y02B 70/10
See application file for complete search history.

(56) References Cited

U.S. PATENT DOCUMENTS

| | | | |
|---|---|---|---|
| 6,370,050 B1 | 4/2002 | Peng et al. | |
| 9,258,858 B2 | 2/2016 | Elferich et al. | |
| 9,526,135 B2 | 12/2016 | Lopez et al. | |
| 9,614,442 B2 | 4/2017 | Chen et al. | |
| 10,116,201 B2 | 10/2018 | Bleus et al. | |
| 2018/0226889 A1* | 8/2018 | Westmoreland | H02M 3/158 |
| 2018/0323713 A1 | 11/2018 | Beland et al. | |
| 2020/0373839 A1* | 11/2020 | Fu | H02M 3/158 |
| 2021/0203222 A1* | 7/2021 | Ilic | H02M 3/07 |

FOREIGN PATENT DOCUMENTS

CN 101262179 A 9/2008

OTHER PUBLICATIONS

Choi, Woo-Young, and Min-Kwon Yang. 2019. "Soft-Switching Bidirectional Three-Level DC-DC Converter with Simple Auxiliary Circuit" Electronics 8, No. 9: 983 (Year: 2019).*

(Continued)

*Primary Examiner* — Kyle J Moody
*Assistant Examiner* — Jye-June Lee

(57) ABSTRACT

In accordance with at least one aspect of this disclosure, a converter system for a three level boost converter. In embodiments, the system includes a voltage input configured to connect to a voltage source, a switching module operatively connected to the voltage input to output quasi-square wave, a voltage output configured to supply voltage to a load, and a logic module. In embodiments, the logic module can be configured to control the switching module to modulate voltage from the voltage source to the voltage output to maintain a zero-voltage switching condition for at least a specified interval, using a method.

17 Claims, 14 Drawing Sheets

(56) References Cited

OTHER PUBLICATIONS

Z. Yao and S. Lu, "Voltage Self-Balance Mechanism Based on Zero-Voltage Switching for Three-Level DC-DC Converter," in IEEE Transactions on Power Electronics, vol. 35, No. 10, pp. 10078-10087, Oct. 2020 (Year: 2020).*
Yao Zhigang et al: "Voltage Self-Balance Mechanism Based on Zero-Voltage Switching for Three-Level DC-DC Converter", IEEE Transactions on Power Electronics, Institute of Electrical and Electronics Engineers, USA, vol. 35, No. 10, Mar. 2, 2020 (Mar. 2, 2020), pp. 10078-10087, XP011796539, ISSN: 0885-8993, DOI: 10.1109/TPEL.2020.2977881.
Liu Bo et al: "A Variable Frequency ZVS Control of a Three-level Buck without Zero Crossing Detection for Wide-Range Output Voltage Battery Chargers", 2019 IEEE Applied Power Electronics Conference and Exposition (APEC), IEEE, Mar. 17, 2019 (Mar. 17, 2019), pp. 2311-2316, XP033555229, DOI: 10.1109/APEC.2019.8722203.
Vazquez A et al: "A very simple analog control for QSW-ZVS source/sink dc-dc converters with seamless mode transition", 2019 IEEE Applied Power Electronics Conference and Exposition (APEC), IEEE, Mar. 17, 2019 (Mar. 17, 2019), pp. 220-226, XP033555935, DOI: 10.1109/APEC.2019.8721813.
Extended European Search Report issued in corresponding EP Patent Applicaiton No. 22195546.1 on Feb. 3, 2023.

\* cited by examiner

THREE-LEVEL BOOST CONVERTER TO MAINTAIN A ZERO-VOLTAGE SWITCHING CONDITION AT AN OUTPUT THEREOF

BACKGROUND

The present disclosure relates generally to power converter, and more particularly to boost converters for use in aircraft.

TECHNICAL FIELD

There is a present need in the art to reduce weight and improve performance of power converters, for example in aircraft applications. This disclosure provides a solution for this need.

SUMMARY

In accordance with at least one aspect of this disclosure, a converter system for a three level boost converter includes a voltage input configured to connect to a voltage source, a switching module operatively connected to the voltage input to output quasi-square wave, a voltage output configured to supply voltage to a load, and a logic module operatively connected to control the switching module to modulate voltage from the voltage source to the voltage output and to maintain a zero-voltage switching condition in the switching module for at least a specified interval. An input line can connect between the voltage input and the switching module, an output line can connect between the switching module and the voltage output, and an inductor can be disposed in a first line of the voltage input.

The switching module can further include a plurality of switches operatively connected to be controlled by the logic module. A first path can be formed from the voltage input through the switching module to the voltage output by a first switch and a fourth switch in a closed state and a second switch and a third switch in an open state. A second path can be formed from the voltage input through the switching module to the voltage output by the second switch and the fourth switch in a closed state and the first switch and the third switch in the open state. A third path can be formed from the voltage input through the switching module and to the voltage output by the first switch and the third switch in the closed state and the second switch and the fourth switch in the open state.

In embodiments, a fourth path can be formed from the voltage input to the voltage output by the second switch and the third switch in the closed state and the first switch and the fourth switch in the open state, such that there is no path formed between the voltage input and the output voltage through the switching module. The logic module can be configured to flow current through inductor between the voltage input and the voltage output through at least one of the first path, the second path, the third path, and/or the fourth path.

The logic module can include a comparator operatively connected to a second line of the voltage input and configured to receive a signal indicative of current through the second line. The comparator can be operative to take a difference of an actual current in the second line to a desired current to achieve a zero-voltage-switching condition, and the logic module can be operative to control a switching frequency of the switching module based at least in part on the difference of the actual current in the second line and the desired current to the achieve zero-voltage-switching condition.

The logic module can include an output voltage controller operatively connected to the voltage output and configured to receive a signal indicative of output voltage based on a load condition. The output voltage controller can be operative to take a difference of an actual output voltage and a desired output voltage, and control a duty cycle of the switching module based at least in part on the difference of the actual output voltage and the desired output voltage to adjust the output voltage towards the desired output voltage for the load condition.

The logic module can include a controllable carrier frequency module operatively connected to the fixed frequency controller configured to receive a signal indicative of a switching frequency. The controllable carrier frequency module can be operative to output a carrier at a desired switching frequency to a negative terminal of a first op amp and a negative terminal of a second op amp. The output voltage controller can be operative to output an output voltage control signal to a positive terminal of the first op amp and a positive terminal of the second op amp. The first op amp and the second op amp can be configured to adjust a switching frequency of the switching module until the difference of the actual current in the second line and the desired current to the achieve zero-voltage-switching condition is zero, and adjust a duty cycle of the switching module until the difference of the actual output voltage and the desired output voltage is zero.

The logic module can include a gate driving module operatively connected to the first and second op amps. The gate driving module can include a first gate driver operatively connected to the first op amp and configured to control the third switch and the fourth switch based at least in part on the switching frequency control signal and the output voltage control signal, and a second gate driver operatively connected to the second op amp and configured to control the first switch and the second switch based at least in part on the switching frequency control signal and the output voltage control signal.

In embodiments, the logic module can be configured to directly adjust a peak value of a fixed frequency counter of the comparator. In embodiments, a capacitor can be operatively connected between the first line and the second line of the voltage input. In embodiments, a carrier of the second and a carrier of the third switch can be 180 degrees out of phase.

In embodiments, the system can include machine readable instructions configured to cause the logic module to form a first path from the voltage input through the switching module to the voltage output and form a second path from the voltage input through the switching module to the voltage output. In certain embodiments, the second path being different than the first path. A duty cycle for the first path can be less than 0.5, and a duty cycle for the second path can be greater than 0.5. The machine readable instructions configured to cause the logic module to adjust a switching frequency of the switching module as a function of a load condition, and impose a dead-time to ensure zero-voltage-switching is maintained for the specified interval. In certain embodiments, an input current into the switching module can be zero at a beginning of the duty cycle.

In accordance with at least one aspect of this disclosure, a method of operating a three-level boost converter to achieve quasi-square wave at a voltage output can include maintaining a zero-voltage-switching condition for the converter at zero current for at least a specified interval. The method can include placing a second switch and a fourth switch into a closed state, and flowing current through an inductor in a path formed by the second and fourth switch.

In embodiments, flowing current through the inductor includes magnetizing the inductor such that a magnetizing slope is Vin-Vout/2. In certain such embodiments, the method can include placing the second switch and a third switch into an open state, placing a first switch and the fourth switch into the closed state, demagnetizing the inductor through a path formed by the first and fourth switches such that a demagnetizing slope is Vin-Vout, placing the fourth switch into the open state when current through the inductor reaches minimum required value to place the third switch into a zero-voltage-switch mode, imposing a dead-time to ensure zero-voltage-switching is maintained for a specified interval.

The method can further include, placing the first switch and the third switch into the closed state, magnetizing the inductor through a path formed by the first and third switches such that the magnetizing slope is Vin-Vout/2, and placing the third switch into the open state. The method can include placing the first switch into the open state when the current flowing through the inductor reaches minimum required value to place the second switch in into a zero-voltage-switch mode, imposing a dead-time to ensure zero-voltage-switching is maintained for a specified interval, placing the second switch and the fourth switch into the closed state, and magnetizing the inductor through a path formed by the second and fourth switches, such that the magnetizing slope is Vin-Vout/2.

In certain embodiments, flowing current through the induction includes demagnetizing the inductor through a path formed by the second and fourth switches such that the demagnetizing slope is Vin-Vout/2. In certain such embodiments, the method can include placing the fourth switch into an open state when current flowing through the inductor reaches a minimum required value to place a third switch into a zero-voltage-switching mode and imposing a dead-time to ensure zero-voltage-switching is maintained for a specified interval.

In embodiments, the method can include, placing the second switch and the third switch into the closed state, magnetizing the inductor through a path formed by the second and third switch, such that the magnetizing slope is Vin, placing the second switch in the open state, placing the first switch and the third switch into the closed state, demagnetizing the inductor through a path formed by the first and third switches, such that the demagnetizing slope is Vin-Vout/2, and placing the first switch into the open state when current flowing through the inductor reaches a minimum required value to turn place the second switch into a zero-voltage-switching mode.

In embodiments, the method can include imposing a dead-time to ensure zero-voltage-switching is maintained for a specified interval, placing the second switch and the third switch into the closed state, magnetizing the inductor through a path formed by the second and third switches such that the magnetizing slope is Vin, placing the third switch into the open state, placing the second switch and the fourth switch into the closed state, and demagnetizing the inductor through a path formed by the second and fourth switches, such that the demagnetizing slope is Vin-Vout/2.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
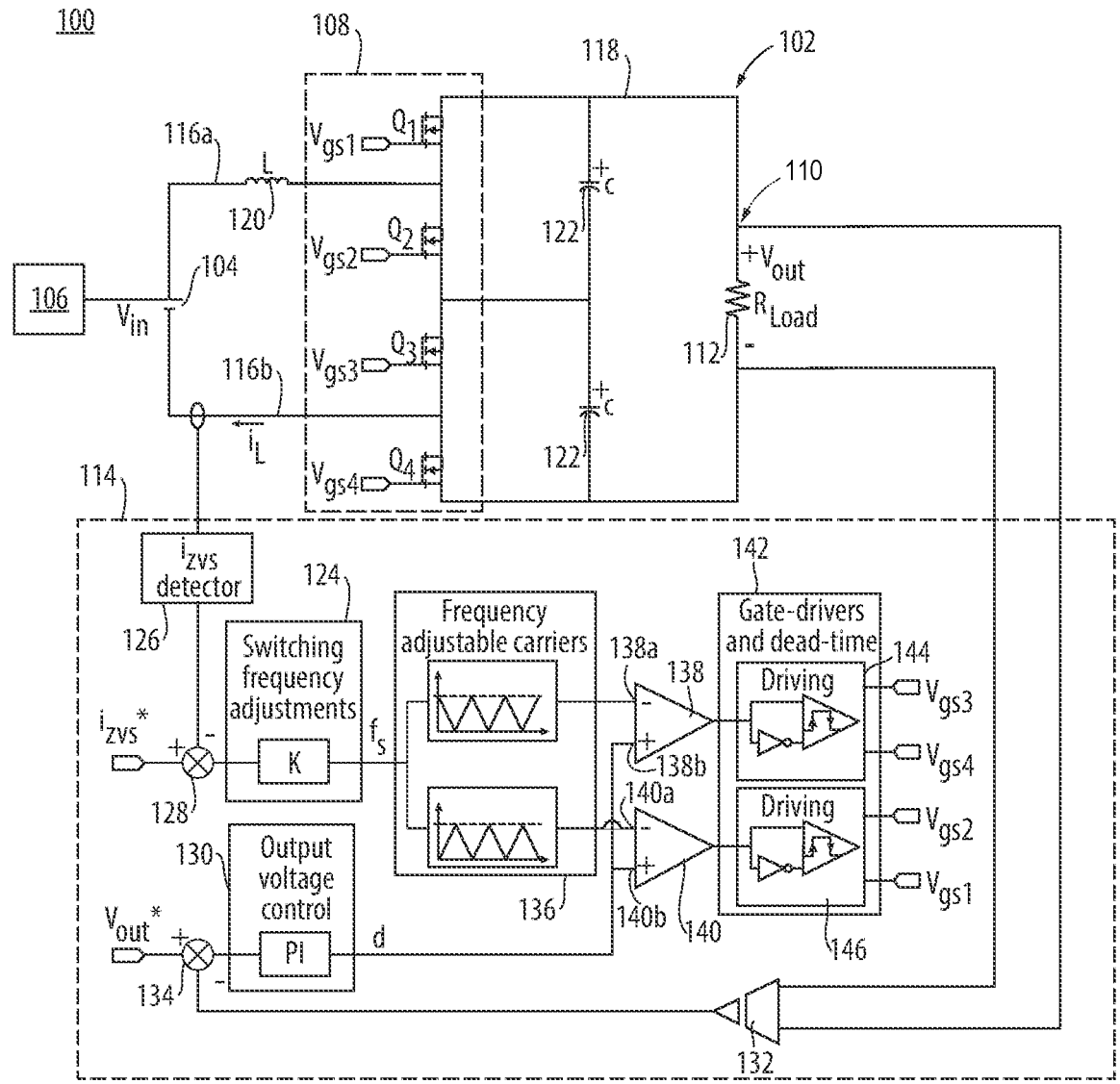
FIG. 1 is a schematic diagrammatic view of a converter system constructed in accordance with at least one aspect of this disclosure, showing an embodiment of a logic module configured to control switching in the converter system.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIGS. 2-10.

There is a present need in the art to reduce weight and improve performance of power converters, for example in aircraft applications. The systems and methods shown and described herein strive to take advantage of soft-switching techniques to reduce switching losses, thus allowing increases in the switching frequency of the power converter. Increasing the switching frequency can significantly reduce weight and volume, while reduction losses by the QSW-ZVS technique provide for improved thermal management at higher switching frequencies. The overall system therefore can enjoy improved safety, and in certain instances, EMI (electromagnetic interference) performance.

The systems and methods disclosed herein adapt quasi-square-wave (QSW) zero-voltage-switching (ZVS) technique to a three-level boost converter. This technique is employed in a three-level boost to enable high voltage operation for electrical aircraft, weight reduction, increased efficiency without adding additional components to the three-level boost converter. In certain embodiments, this approach can be used to increase power density related to power and controls and interior products, such as for high voltage applications and in dc-dc converters that could be used as an interface for a battery or fuel cell.

One solution for volume and weight minimization in power converters is increasing frequency operation, for example using pulse width-modulation. Increasing the switching frequency of traditional pulse width-modulated (PWM) converters leads to size reduction of the passive elements (i.e., capacitors, inductors, transformers) which are key contributors to the overall volume and weight in power converters. However, this comes at the cost of higher switching losses and increased thermal dissipation. Consequently, both the semiconductor's temperature and the cooling system's size will increase, which are also limiting factors to be added to the passive elements volume and weight minimization.

In certain cases, the semiconductors' turn-on losses in a traditional bidirectional boost converter can be reduced to zero, near zero, or almost zero by employing a QSW technique which discharges the drain-source parasitic capacitances of the devices before they are switched on (i.e., ZVS operation). By removing part of the semiconductor's switching losses the technique enables the power converter's switching frequency to increase and the overall weight and volume of the system are reduced. To achieve ZVS in the converter, the QSW can be applied to traditional dc-dc converters without the requirement of any extra circuits or complex control techniques. Moreover, operating QSW necessarily requires larger current ripple at the power inductor which, apart from the switching frequency variable, can also lead towards further reductions in the magnetics weight and volume.

In accordance with at least one aspect of this disclosure, a converter system 100 for a three level boost converter 102 is shown in FIG. 1. In certain embodiments, the boost converter 102 can be bi-directional, or can be uni-directional. In embodiments, the system 100 includes a voltage input 104 configured to connect to a voltage source 106, a switching module 108 operatively connected to the voltage input 104 to output quasi-square wave, a voltage output 110 configured to supply voltage to a load 112, and a logic module 114. In embodiments, an input line 116 connects between the voltage input 104 and the switching module 108, an output line 118 connects between the switching module 108 and the voltage output 110, an inductor 120 is disposed in a first line 116a of the voltage input line 116 and at least one capacitor 122 operatively connects between the first line 116a and a second line 116b of the voltage input line 116.

In embodiments, the logic module 114 can be configured to control the switching module 108 to modulate voltage from the voltage source 106 to the voltage output 110 to maintain a zero-voltage switching condition for at least a specified interval (e.g. as described below with respect to methods 200, 300).

Figure 4A:
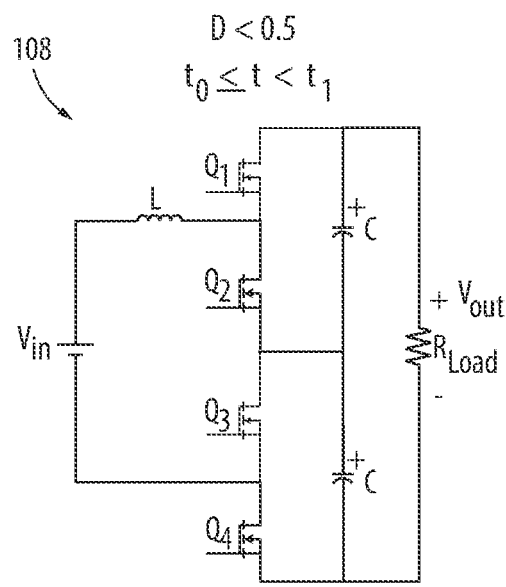
FIGS. 4a-4i are schematic diagrammatic views of the converter system of FIG. 1, showing equivalent circuits for duty cycle smaller than 0.5.
Figure 4B:
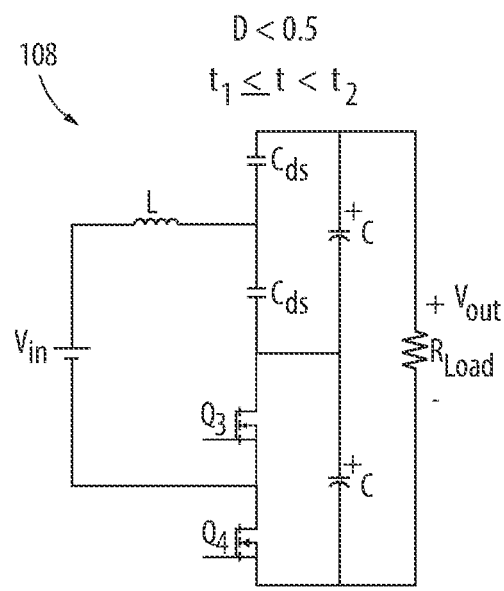
Figure 4C:
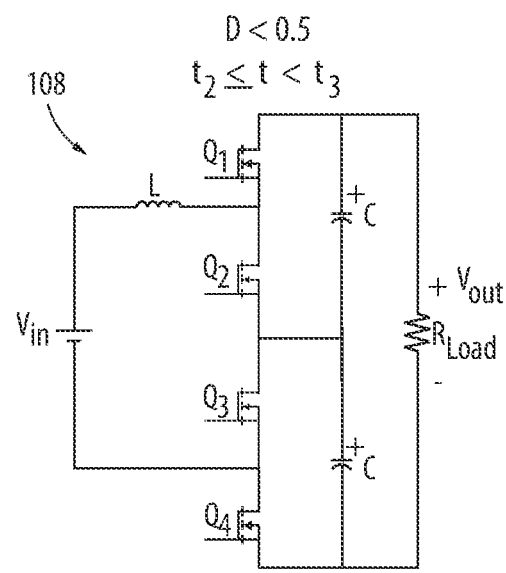
Figure 4D:
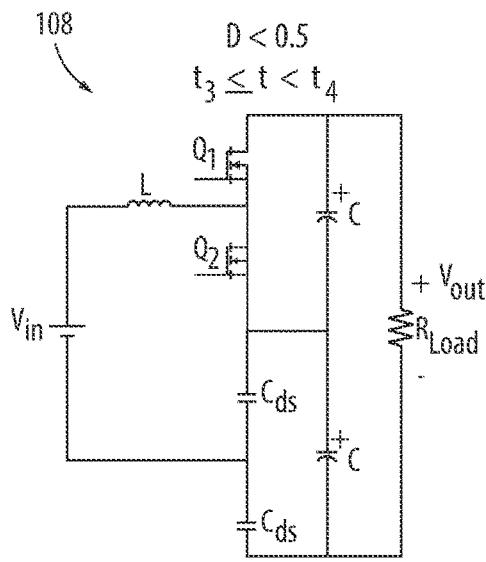

In certain embodiments, the switching module 108 further includes a plurality of switches Q1, Q2, Q3, and Q4 opera- tively connected to be controlled by the logic module 114. In certain instances, a first path (e.g. as shown in FIGS. 4c and 4g) is formed from the voltage input 104 through the switching module 108 to the voltage output 110 by a first switch Q1 and a fourth switch Q4 in a closed state and a second switch Q2 and a third switch Q3 in an open state. In certain instances, a second path (e.g. as shown in FIGS. 4a, 4i, 6a, and 6i) is formed from the voltage input 104 through the switching module 108 to the voltage output 110 by the second switch Q2 and the fourth switch Q4 in a closed state and the first switch Q1 and the third switch Q3 in the open state.

Figure 4E:
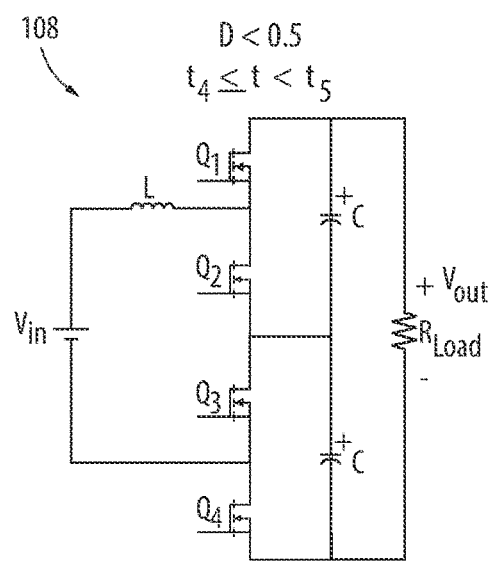
Figure 6A:
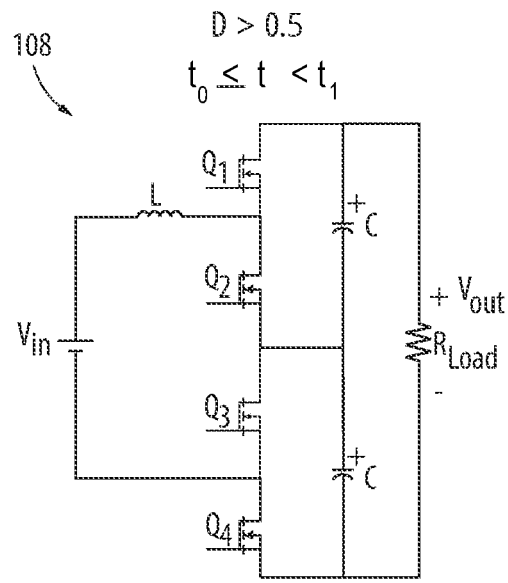
FIGS. 6a-6i are schematic diagrammatic views of the converter system of FIG. 1, showing equivalent circuits for duty cycle greater than 0.5.

In certain instances, a third path (e.g. as shown in FIG. 4e) is formed from the voltage input 104 through the switching module 108 and to the voltage output 110 by the first switch Q1 and the third switch Q3 in the closed state and the second switch Q2 and the fourth switch Q4 in the open state. In certain instances, a fourth path (e.g. as shown in FIG. 6g) is formed from the voltage input 104 through the inductor and to the voltage output 110 by the second switch Q2 and the third switch Q3 in the closed state and the first switch Q1 and the fourth switch Q4 in the open state, where the path does not pass through the switching module 108.

It is also possible for paths to be formed in the intermediate (e.g. during dead-times, or during transition between paths), such as shown in FIGS. 4b, 4d, 4f, and 4h, and similarly in FIGS. 6b, 6d, 6f, and 6h, where only a single switch is in the closed state. In certain embodiments, carriers of the second and third switches Q2, Q3 are 180 degrees out of phase. For example, the second and third switches Q2, Q3 can have equal states simultaneously (as seen with the methods 200 and 300), but their triangular waveforms (i.e., carriers) which generate their switching signals for a given duty cycle are 180 degrees out of phase, which is important in operating the method 100 which can be carrier based (e.g., PWM modulation).

In certain embodiments, the logic module 114 is configured to flow current through inductor 120 between the voltage input 104 and the voltage output 110 through at least one of the first path, the second path, and/or the third path. For example, in certain embodiments, the logic module 114 can be or include at least one of a proportional-integral, proportional-derivative, and/or proportional-integral-derivative (PID) controller, however any suitable logic and/or predictive logic module may be used or employed. The logic module as shown in FIG. 1 shows a simple approach for digital control where the switching frequency is adjusted according to the current measurement and a given load condition.

In certain embodiments, a comparator 124 is operatively connected to the second line 116b of the voltage input 104 and configured to receive a signal indicative of current through the second line 116b, for example using a ZVS current detector 126 operatively connected between the second line 116b and a comparator 128. The comparator 124 can thus be configured for extracting the point at which iZVS is reached. The comparator 128 is operative to take a difference of an actual current in the second line 116b to a desired current iZVS to achieve a zero-voltage-switching condition. Accordingly, the logic module 114 is operative to control switching frequency of the switching module 108 based at least in part on the difference of the actual current in the second line and the desired current to the achieve zero-voltage-switching condition from the comparators 124, 128. In certain embodiments, the logic module 114 can be configured to directly adjust a peak value of the comparator 124.

In certain embodiments, the logic module 114 further includes an output voltage controller 130 operatively connected to the voltage output 110 and configured to receive a signal indicative of output voltage based on a load condition from a voltage sensor 132 operatively connected between the voltage output 110 and a comparator 134. The comparator 134 is operative to take a difference of an actual output voltage and a desired output voltage control such that the output voltage controller 130 can control the duty cycle of the switching module 108 based at least in part on the difference of the actual output voltage and the desired output voltage to adjust the output voltage towards the desired output voltage for the load condition.

In certain embodiments, the logic module 114 further includes a controllable carrier frequency module 136 operatively connected to the comparator 124 configured to receive a signal indicative of a switching frequency. The controllable carrier frequency module 136 is operative to output a carrier at a desired switching frequency to a negative terminal 138a of a first op amp 138 and a negative terminal 140a of a second op amp 140. The output voltage controller 130 is configured to output an output voltage control signal to a positive terminal 138b of the first op amp 138 and a positive terminal 140b of the second op amp 140. The first op amp 138 and the second op amp 140 can be configured to adjust the switching frequency of the switching module 108 to until the difference of the actual current in the second line and the desired current to the achieve zero-voltage-switching condition is zero. The first op amp 138 and the second op amp 140 can also be configured to adjust the duty cycle of the switching module 108 until the difference of the actual output voltage and the desired output voltage is zero.

In embodiments, the logic module 114 further includes a gate driving module 142 operatively connected to the first and second op amps 138, 140. In certain embodiments, the gate driving module 142 includes a first gate driver 144 operatively connected to the first op amp 138 and configured to control the third switch Q3 and the fourth switch Q4 based at least in part on the switching frequency control signal and the output voltage control signal. In certain embodiments, the gate driving module can also include a second gate driver 146 operatively connected to the second op amp 140 and configured to control the first switch Q1 and the second switch Q2 based at least in part on the switching frequency control signal and the output voltage control signal.

Figure 2A:
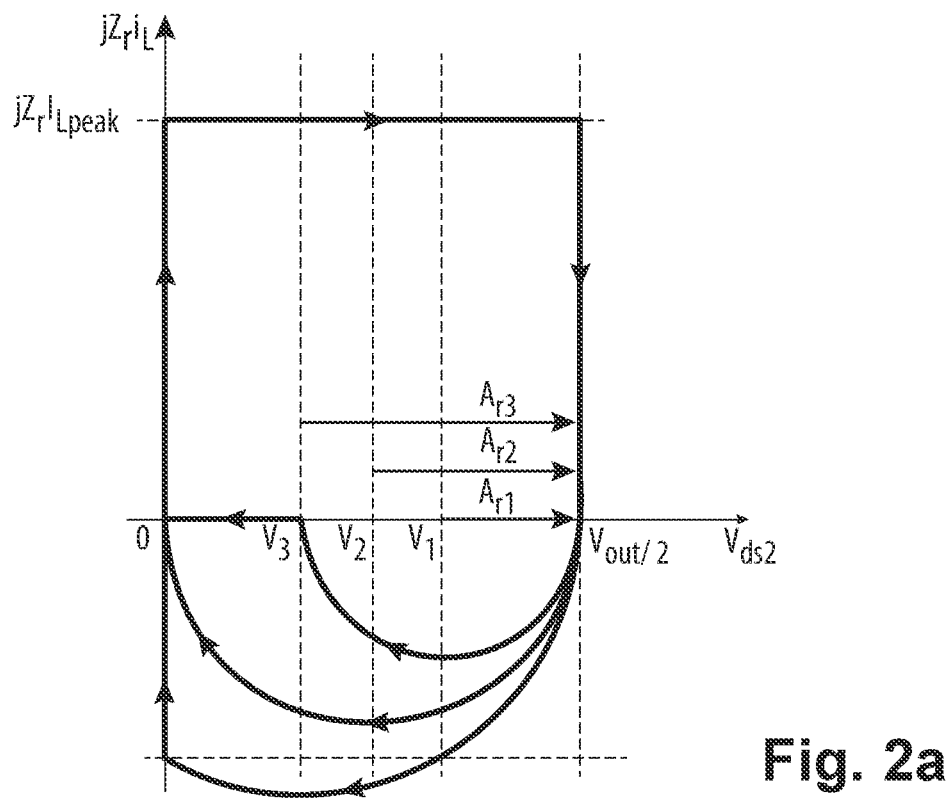
FIG. 2a is a state plane representation of a switching cycle with three different input voltages.
Figure 2B:
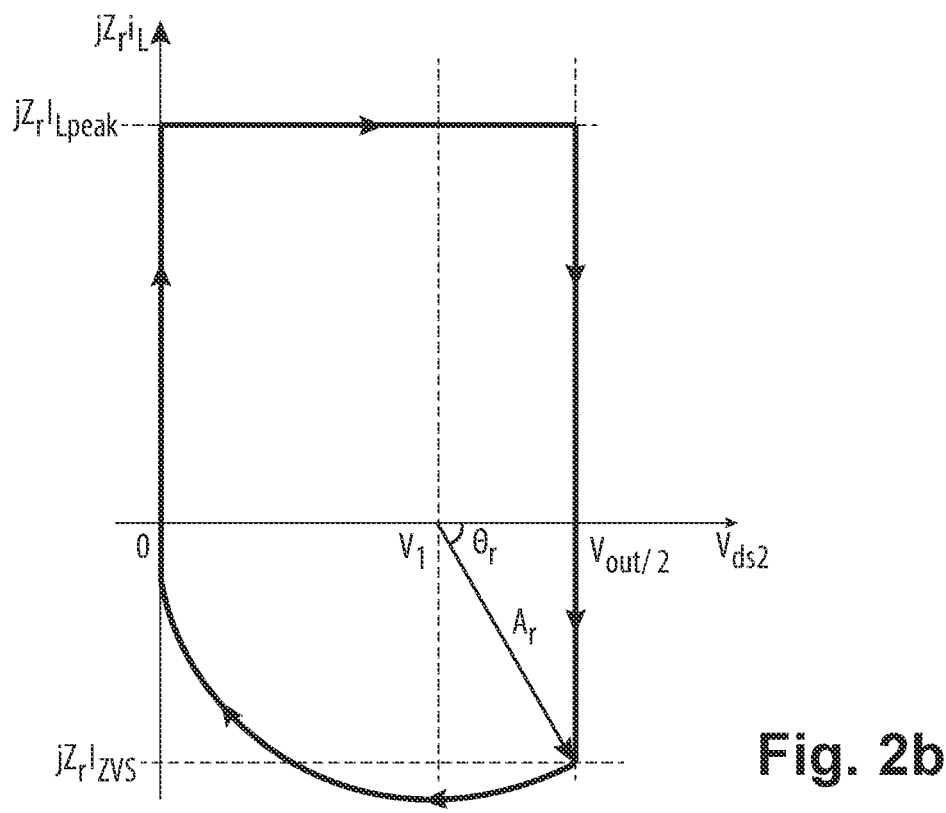
FIG. 2b is a state plane representation of a switching cycle deploying negative current to achieve zero-voltage-switching (ZVS) for larger input voltages.

Using the system 100 as described above, as can be seen in FIG. 2a (three-level boost state plane representation of a switching cycle with three different input voltages), different input voltages (i.e., V1, V2 and V3) will incur in different Ar resonance vector length for iZVS equal to zero. While V3 reaches zero voltage during the resonance and V2 is the limit case to achieve ZVS, at V1 the vector length Ar1 is not large enough to ensure ZVS operation. Based in the equivalent circuit in a bi-directional two level boost converter, the minimum input-to-output voltage relation required to achieve ZVS in a traditional boost can be defined as: $V_{in} < V_{out}/2$. Moreover, iZVS can be set to values smaller than zero in order to include values larger than V2 in the QSW ZVS operation. As represented in FIG. 2b (three-level boost state plane representation of a switching cycle deploying negative current to achieve ZVS for larger input voltages), by allowing a certain negative value for iZVS the initial conditions of the resonance are changed, therefore increasing Ar vector length.

This technique is applied to the three-level boost converter 102 as the one presented in FIG. 1. If compared to a traditional boost converter, the three-level boost at the same switching frequency has much smaller passive components and voltage stress over the semiconductors, which already set a clear advantage in power density and specific power, even with an increased number of active components. By applying a QSW ZVS technique to the converter 102, its switching frequency can be pushed higher resulting in even greater achievements in power density and specific power. Such an outcome can be beneficial in an aerospace application, for example, in electrified aircrafts where dc/dc interfaces to energy storage systems are required.

Figure 3:
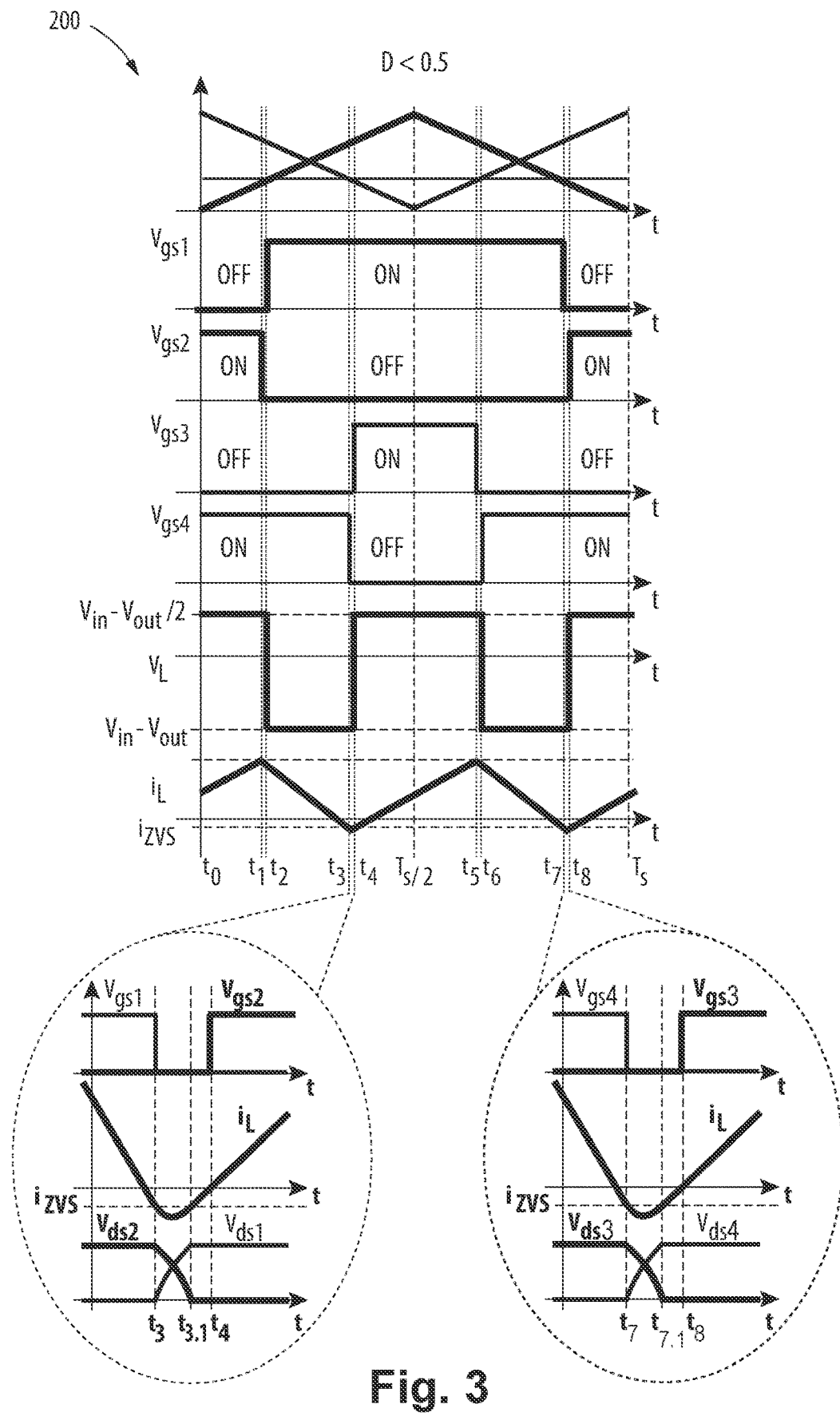
FIG. 3 is a wave form diagram for the converter of FIG. 1 for duty cycle smaller than 0.5.
Figure 4F:
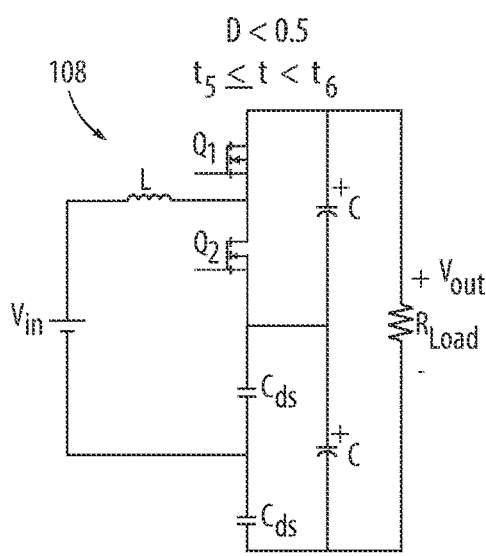
Figure 4G:
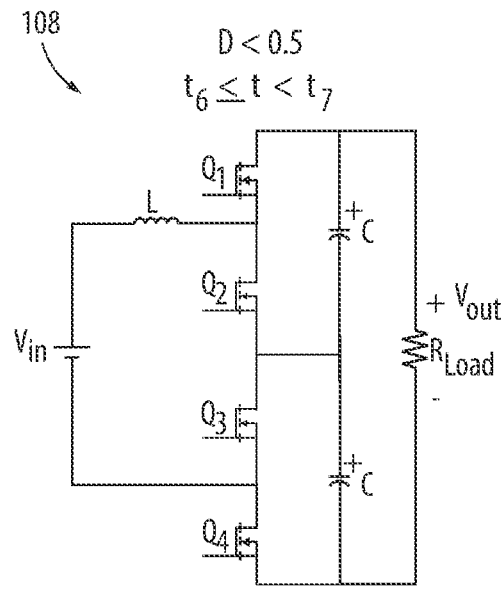
Figure 4H:
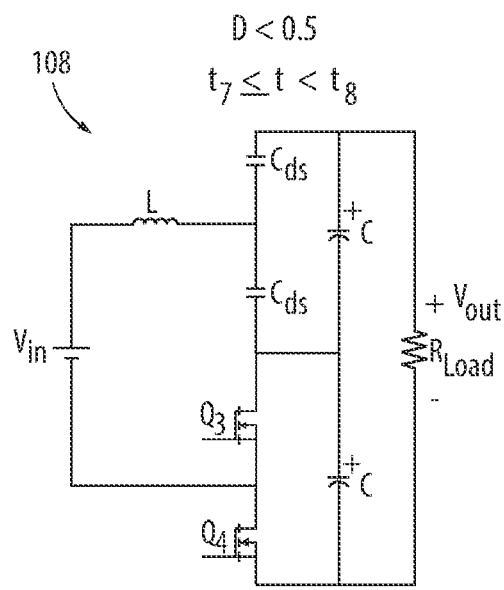
Figure 4I:
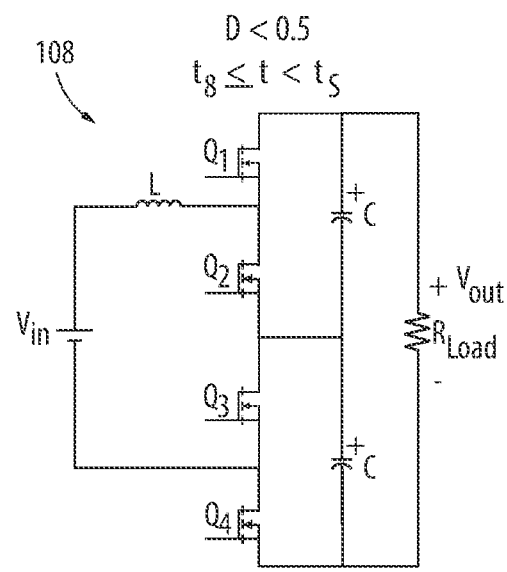
Figure 5:
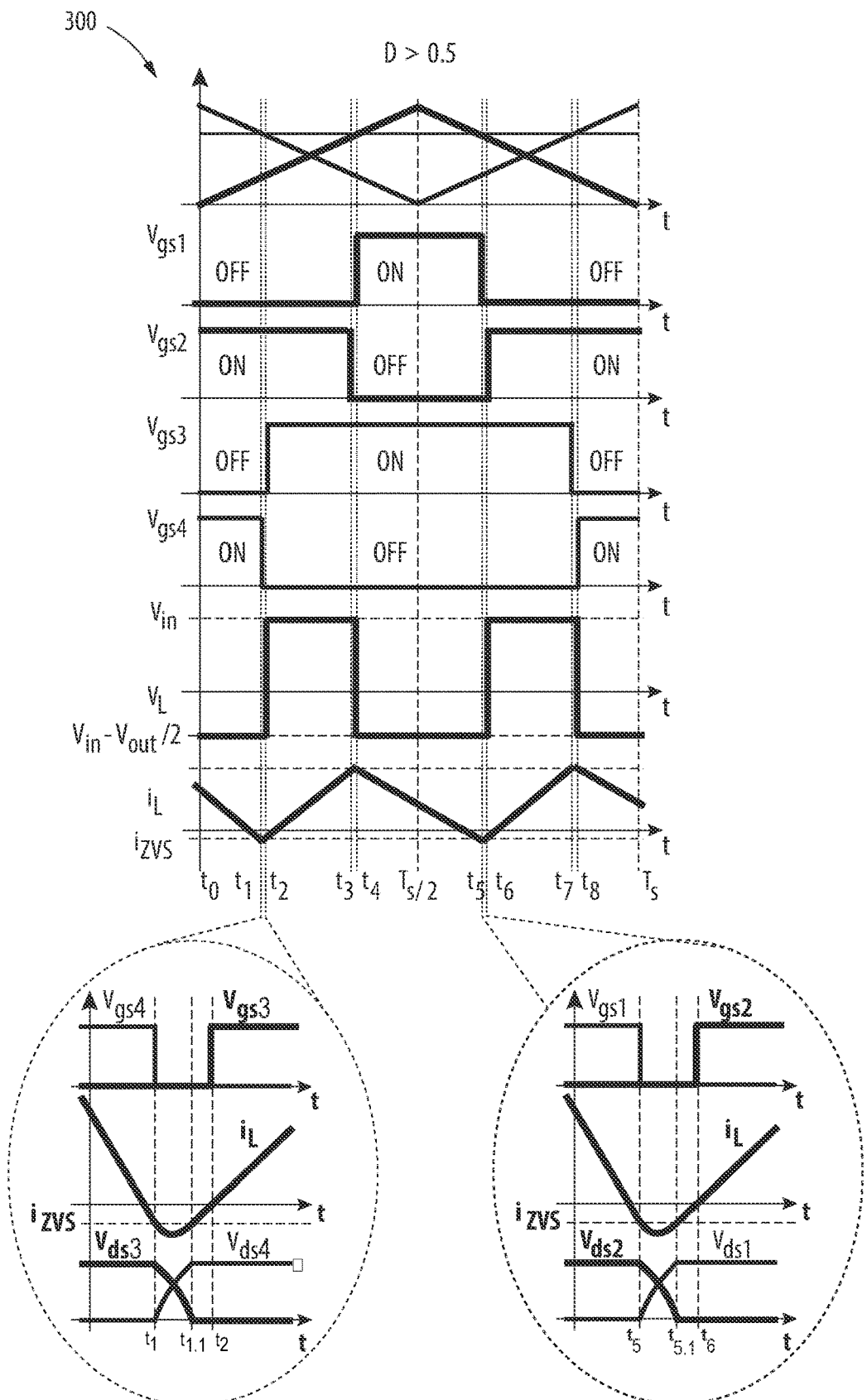
FIG. 5 is a wave form diagram for the converter of FIG. 1 for duty cycle greater than 0.5.

Due to the circuit assembly and inherent 180° phase-shifted operation between the second and third switch carriers, the topology can include different equivalent circuits during the dead-time from that of a traditional boost converter. The duty cycle region impacts the converter's operation as well, consequently forming two different equivalent circuits during dead-time: one if the duty cycle is less than 0.5 (D<0.5, as shown in FIGS. 3-4i), and one if the duty cycle is greater than 0.5 (D>0.5, as shown in FIGS. 5-6i). The differences can be clearly seem in FIG. 7 for example, represented for the second switch Q2. It should be appreciated that the operation of the third switch Q3 is symmetrical to that of the second switch Q2, therefore the transition of the third switch Q3 is not shown. From FIG. 7, the conditions to achieve QSW ZVS operation with iZVS equal to zero can now be redefined as:

$$V_{in} < \begin{cases} \dfrac{3V_{out}}{4}, & D < 0.5 \\ \dfrac{V_{out}}{4}, & D > 0.5 \end{cases}$$

From the above equation, it can be concluded that in the three-level boost different regions of the duty cycle range are covered for QSW ZVS operation with iZVS equal zero if compared to the traditional boost converter. From 0.25 to 0.5 (e.g. for a duty cycle), for instance, is established a different region uncovered by the traditional boost converter that can operate QSW ZVS with zero iZVS in a three-level boost, which can be confirmed with simulation results for a 400 W, 28V input, 48V output bidirectional three-level boost achieving QSW ZVS by starting the dead-time with nearly zero current in the inductor 120. Moreover, the same conditions as in FIG. 2b for negative iZVS are equally applied to the three-level boost converter.

In order to control the three-level boost in QSW mode and guarantee ZVS, the converter's 102 switching frequency can be adjusted according to the load applied to the system. More precisely, as the load changes, the average current through the inductor 120 is also changed, thus shifting the minimum current value at the end of the demagnetizing period for the same switching frequency. This will impact on the reached iZVS value by the converter 102 and consequently moving the converter 102 out of the ZVS region or increasing the conduction losses. In certain embodiments, because a hysteresis-based modulator may not be necessary for the system 100, the system 100 as shown in FIG. 1, proposes a different approach to modify the carrier frequencies according to the load state, e.g. rather than hysteresis based modulator of traditional systems. In the system 100, the output of the logic module 114 could directly change the peak value of a fixed-frequency counter of the comparator 124. By changing the peak value, the time taken to count to this given peak value will change (e.g. be longer or shorter), thus, the perceived carrier frequency (i.e., the waveform formed by the counter) will change and consequently the converter 102 will operate at variable frequency.

In certain embodiments, the system 100 can include machine readable instructions configured to cause the logic module 114 to perform a method. In certain embodiments, the system can include a dedicated controller that can be or include both hard wired circuits that cause the logic to be executed, and/or software-based components, for example, simple electric circuits employing analogue components. In certain embodiments, the system 100 can include a CPU and a memory, where the machine readable instructions can be stored in the memory such that when executed cause the CPU to perform the method, or instruct the logic module 114 to perform the method. In certain embodiments, the logic module 114 can include the CPU and memory, where the machine readable instructions are stored in the memory such that when executed cause the logic module 114 to perform the method.

Generally, the method 200, 300 can include forming a first path from the voltage input 104 through the switching module 108 to the voltage output 110, forming a second path from the voltage input 104 through the switching module 108 to the voltage output 110 (the second path is different than the first path), where a duty cycle for the first path is less than 0.5 and a duty cycle for the second path is greater than 0.5. The method 200, 300 can further include adjusting a switching frequency of the switching module 108 as a function of a given load condition and imposing a dead-time to ensure zero-voltage-switching is maintained for the specified interval. In certain embodiments, the input current into the switching module 108 can be zero at a beginning of the duty cycle.

More specifically, FIGS. 3-6i show a method of operating the bi-directional three-level boost converter 102 to achieve quasi-square wave at the voltage output 110 can include maintaining a zero-voltage-switching condition for the converter at zero current for the specified interval.

As shown in FIG. 3, the method 200 can be performed for the system in a first mode, where the first mode include a duty cycle of less than 0.5. FIG. 3 shows a logic table for each switch at each time t from time t0 to tS and FIGS. 4a-4i shows the corresponding circuit diagrams for each time t as the method is carried out. The method 200 can include, at time t0 to t1, placing the second switch Q2 and the fourth switch Q4 into a closed state and flowing current through the inductor 120 in a path formed by the second and fourth switch Q2, Q4 (e.g. as shown in FIG. 4a), magnetizing the inductor 120 such that a magnetizing slope is Vin-Vout/2.

At time t1 to t2, the method 200 includes placing the second switch Q2 into an open state (e.g. as shown in FIG. 4b) and the specified interval is defined as the necessary dead-time to avoid shoot-through when turning the first switch Q1 into the closed state. At time t2 to t3, the method 200 includes placing the first switch Q1 and the fourth switch Q4 into the closed state (e.g. as shown in FIG. 4c), demagnetizing the inductor 120 through a path formed by the first and fourth switches Q1, Q4 such that a demagnetizing slope is Vin-Vout.

At time t3 to t3.1, the method 200 includes placing the fourth switch Q4 into the open state when current through the inductor 120 reaches minimum required value to turn place the third switch Q3 into a zero-voltage-switch mode at the next specified interval (e.g. as shown in FIG. 4d). Here, the specified interval is defined by the resonance of the drain-source capacitances of the third switch Q3 and the fourth switch Q4 with the inductor 120, where the third switch Q3 capacitance is discharged while the fourth switch Q4 is proportionally charged. At time t3.1 the drain-source voltage over the third switch Q3 reaches zero, its body diode starts conducting, and the interval ends.

At time t3.1 to t4, the method 200 includes imposing a dead-time to ensure zero-voltage-switching is maintained for a specified interval. Here, t3.1 to t4 is the remaining time of the aforementioned interval after the resonance period. This interval can be reduced as much as possible while ensuring a safe margin for operation.

After the specified interval, at time t4 to t5, the method 200 can then include placing the first switch Q1 and the third switch Q3 into the closed state (e.g. as shown in FIG. 4e), magnetizing the inductor 120 through a path formed by the first and third switches Q1, Q3, such that the magnetizing slope is Vin-Vout/2. At time t5 to t6, the method 200 can include placing the third switch Q3 into the open state, where the specified interval is defined as the necessary dead-time to avoid shoot-through when turning Q4 into the closed state at t6 (e.g. as shown in FIG. 4f).

At time t6 to t7, the method 200 includes, placing the first switch Q1 into the closed state with the fourth switch Q4 (e.g. as shown in FIG. 4g), demagnetizing the inductor 120 through the path formed by the first and fourth switches Q1, Q4 so that the demagnetizing slope is Vin-Vout. At time t7 to t7.1, the method can include placing the first switch Q1 into the open state when the current flowing through the inductor 120 reaches minimum required value to place the second switch Q2 in into a zero-voltage-switch mode in the next interval (e.g. as shown in FIG. 4h). Here, the specified interval is defined by the resonance of the drain-source capacitances of the second switch Q2 and the first switch Q1 with the inductor 120, where the second switch Q2 capacitance is discharged while the first switch Q1 is proportionally charged. At t7.1 the drain-source voltage over Q2 reaches zero, its body diode starts conducting and the interval ends.

At time t7.1 to t8, the method 200 can include imposing a dead-time to ensure zero-voltage-switching is maintained for a specified interval. Here, t7.1 to t8 is the remaining time of the aforementioned specified interval after the resonance period. This interval can be reduced as much as possible while ensuring a safe margin for operation.

After this specified interval, at time t8 to tS, the method 200 can include placing the second switch Q2 and the fourth switch Q4 into the closed state (e.g. as shown in FIG. 4i), and magnetizing the inductor 120 through a path formed by the second and fourth switches Q2, Q4, such that the magnetizing slope is Vin-Vout/2. In embodiments, the method can be repeated as many times as needed or desired.

As shown in FIG. 5, a method 300 can be performed for the system 100 in a second mode, where the second mode includes a duty cycle of greater than 0.5. FIG. 5 shows a logic table for each switch at each time t from time t0 to tS and FIGS. 6a-6i shows the corresponding circuit diagrams for each time t as the method is carried out. In this mode, the method 300 can include, at time t0 to t1, placing the second switch Q2 and the fourth switch Q4 into the closed state (e.g. as shown in FIG. 6a), and flowing current through the inductor 120 in a path formed by the second and fourth switch Q2, Q4, demagnetizing the inductor 120 such that the demagnetizing slope is Vin-Vout/2.

Figure 6B:
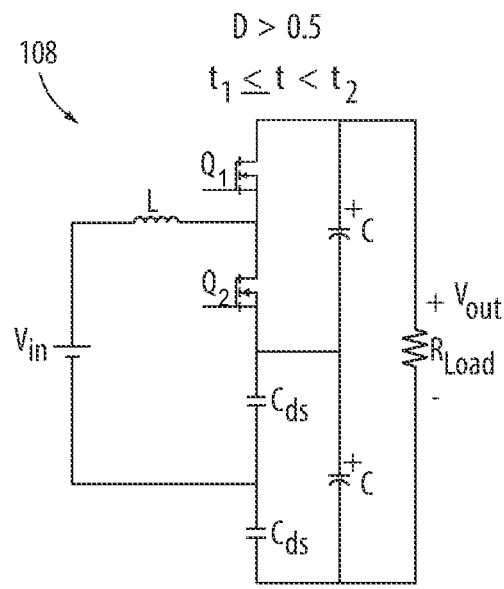

At time t1 to t1.1, the method 300 can include placing the fourth switch Q4 into the open state when current flowing through the inductor reaches a minimum required value to place the third switch into a zero-voltage-switching mode in the next interval (e.g. as shown in FIG. 6b). Here, the specified interval is defined by the resonance of the drain-source capacitances of the third switch Q3 and the fourth switch Q4 with the inductor 120, where the third switch Q3 capacitance is discharged while the fourth switch Q4 is proportionally charged. At t1.1, the drain-source voltage over Q3 reaches zero, its body diode starts conducting and the interval ends. At time t1.1 to t2, the method 300 includes imposing a dead-time to ensure zero-voltage-switching is maintained for a specified interval, where the specified interval is t1.1 to t2, the remaining time of the aforementioned interval after the resonance period. This interval can be reduced as much as possible while ensuring a safe margin for operation.

Figure 6C:
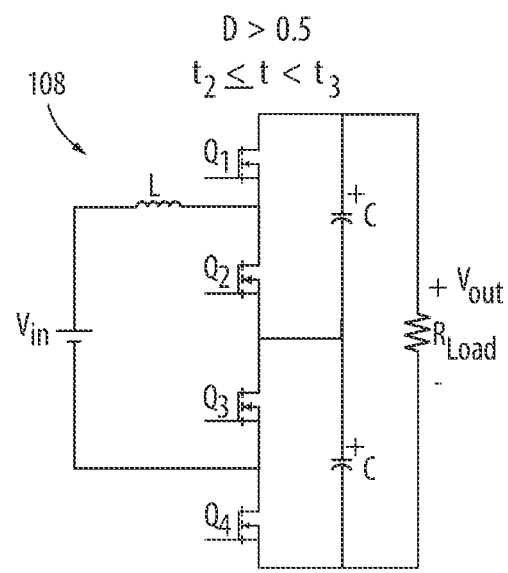

After the specified interval, at time t2 to t3, the method 300 can then include placing the second switch Q2 and the third switch Q3 into the closed state (e.g. as shown in FIG. 6c), magnetizing the inductor through a path formed by the second and third switch Q2, Q3, such that the magnetizing slope is Vin.

Figure 6D:
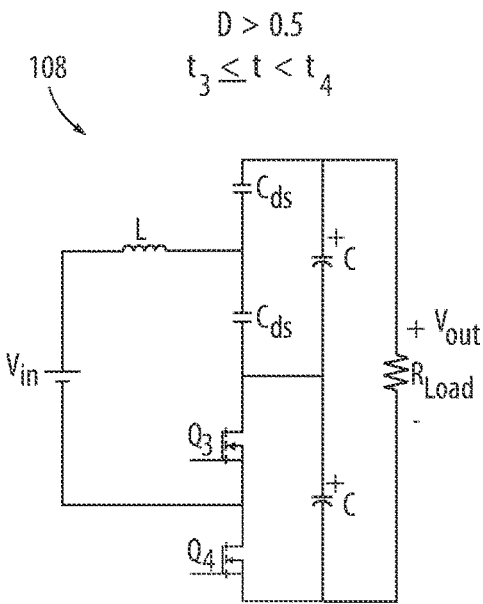
Figure 6E:
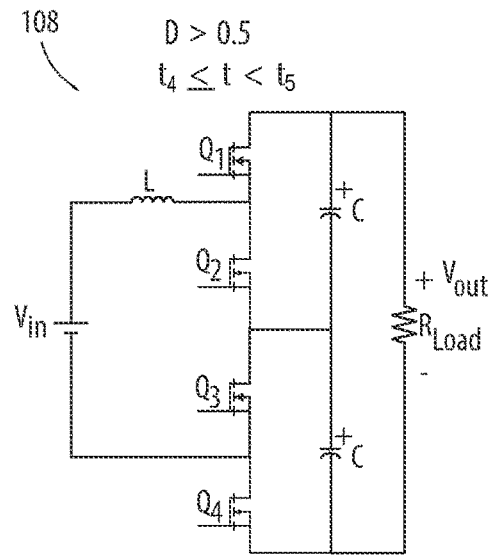

At time t3 to t4, the method 300 includes placing the second switch Q2 in the open state (e.g. as shown in FIG. 6d), where the specified interval is defined as the necessary dead-time to avoid shoot-through when turning the first switch Q1 into the closed position at t4. At time t4 to t5, the method 300 includes placing the first switch Q1 and the third switch Q3 into the closed state (e.g. as shown in FIG. 6e), demagnetizing the inductor 120 through a path formed by the first and third switches Q1, Q3, such that the demagnetizing slope is Vin-Vout/2.

Figure 6F:
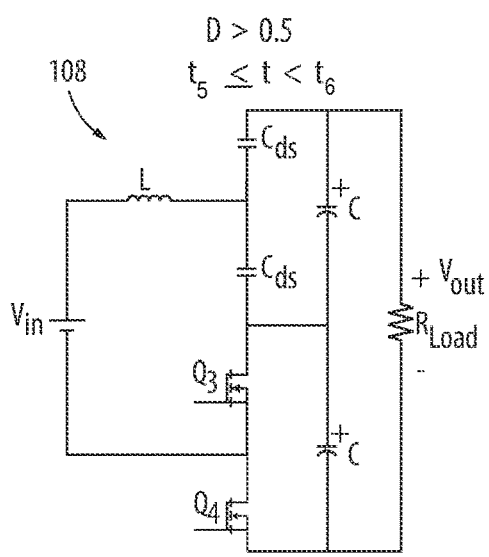
Figure 6G:
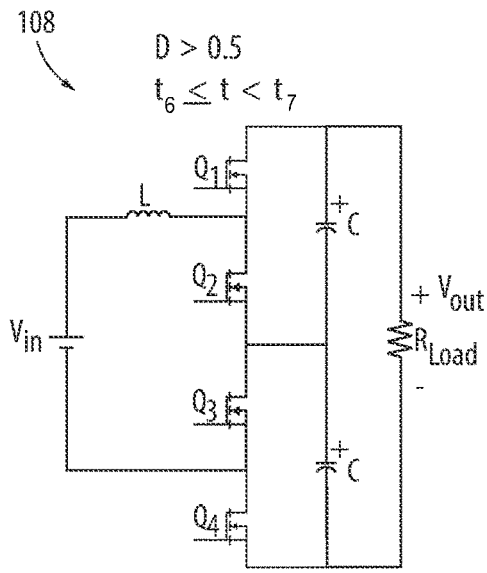

At time t5 to t5.1, the method 300 includes placing the first switch Q1 into the open state when current flowing through the inductor reaches a minimum required value to turn place the second switch into a zero-voltage-switching mode in the next interval (e.g. as shown in FIG. 6f). Here, the specified interval is defined by the resonance of the drain-source capacitances of the second switch Q2 and the first switch Q1 with the inductor 120, where the second switch Q2 capacitance is discharged while the first switch Q1 is proportionally charged. At time t5.1, the drain-source voltage over the second switch Q2 reaches zero, its body diode starts conducting and the interval ends.

At time t5.1 to t6, the method 300 can further include, imposing a dead-time to ensure zero-voltage-switching is maintained for a specified interval. Time t5.1 to t6 is the remaining time of the aforementioned interval after the resonance period. This interval can be reduced as much as possible while ensuring a safe margin for operation. After the specified interval, at time t6 to t7, the method 300 includes placing the second switch Q2 and the third switch Q3 into the closed state (e.g. as shown in FIG. 6g), magnetizing the inductor through a path formed by the second and third switches Q2, Q3, such that the magnetizing slope is Vin.

Figure 6H:
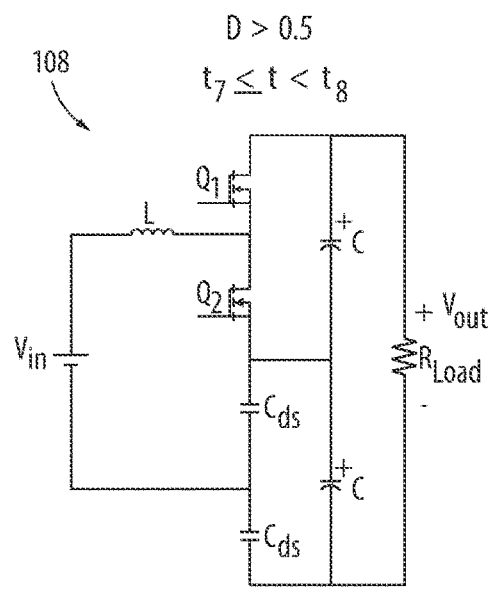
Figure 6I:
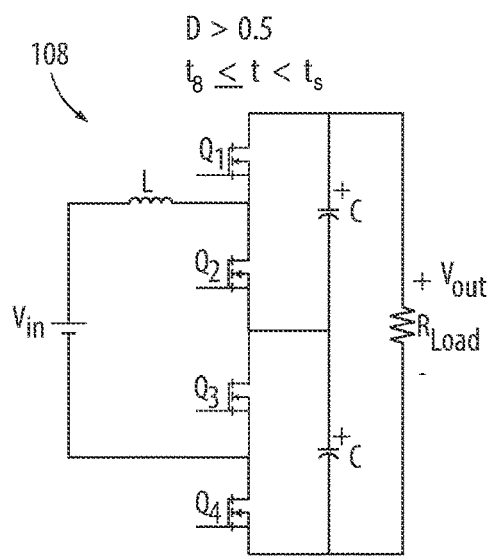
Figure 7:
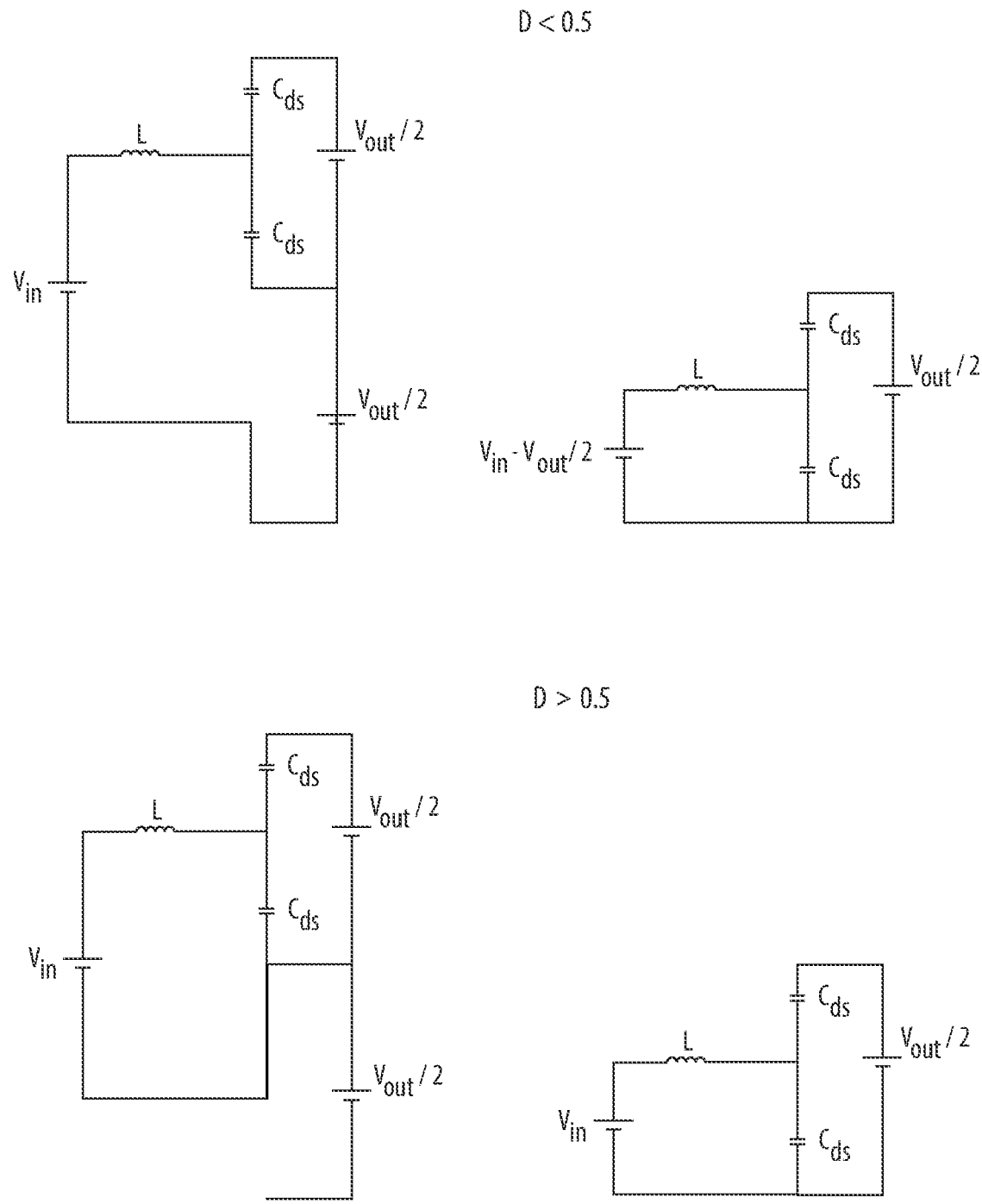
FIG. 7 is a schematic diagrammatic view of the converter system of FIG. 1, showing equivalent circuit during resonance for duty cycle smaller than 0.5 and duty cycle larger than 0.5.

At time t7 to t8, the method 300 can include placing the third switch Q3 into the open state (e.g. as shown in FIG. 6h), where the specified interval is defined as the necessary dead-time to avoid shoot-through when turning the fourth switch Q4 on at t8. Finally, at time t8 to tS, the method 300 can include placing the second switch Q2 and the fourth switch Q4 into the closed state (e.g. as shown in FIG. 6i), demagnetizing the inductor 120 through a path formed by the second and fourth switches Q2, Q4, such that the demagnetizing slope is Vin-Vout/2. In embodiments, the method can be repeated as many times as needed or desired.

Figure 8:
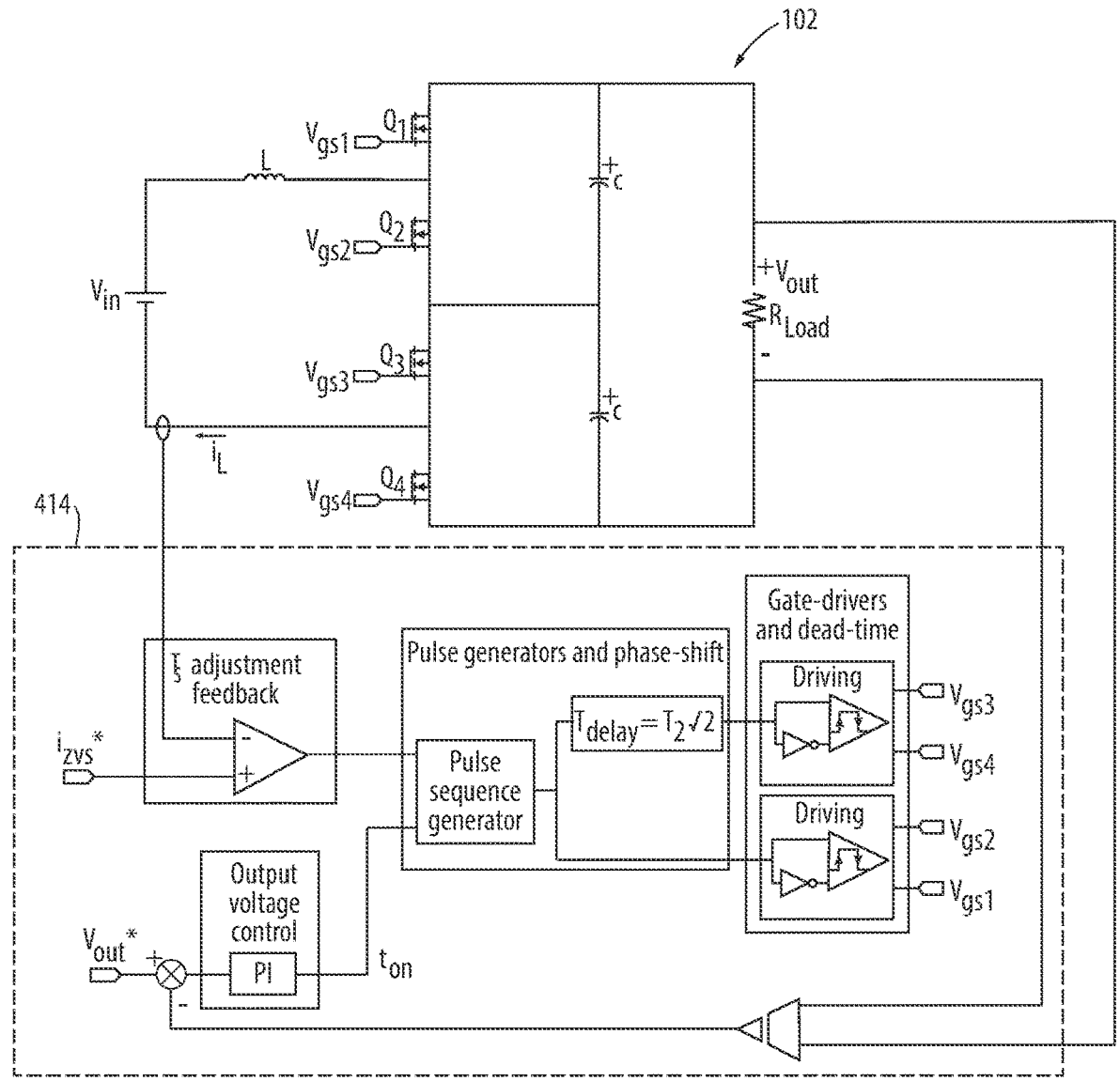
FIG. 8 is a schematic diagrammatic view of another converter system constructed in accordance with at least one aspect of this disclosure, showing another embodiment of a logic module configured to control switching in the converter system.
Figure 9:
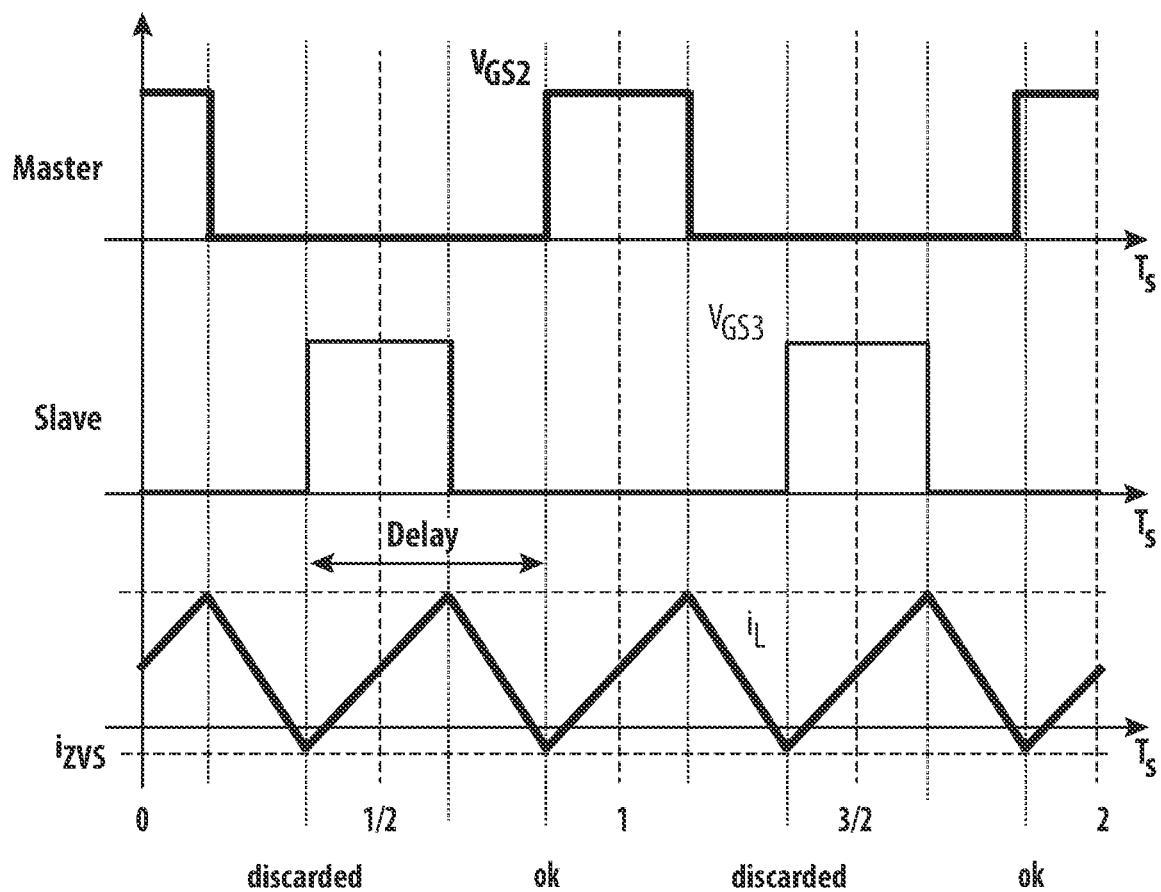
FIG. 9 is wave form diagram showing digital implementation for the converter of FIG. 8.

In accordance with another aspect of this disclosure, as shown in FIGS. 8-9, a system 400 can include similar components as in system 100. For brevity, the description of common elements that have been described above are not repeated with respect to FIG. 8-9. In system 400, the method (e.g. 200, 300) can be applied operating the second and third switches Q2, Q3 in a master/slave system and digitally generating the switching signals from the output of the control loop and inductor's current measurement, e.g. using the logic module 414. FIG. 9 shows the respective waveforms in digital implementation for such a configuration.

Figure 10:
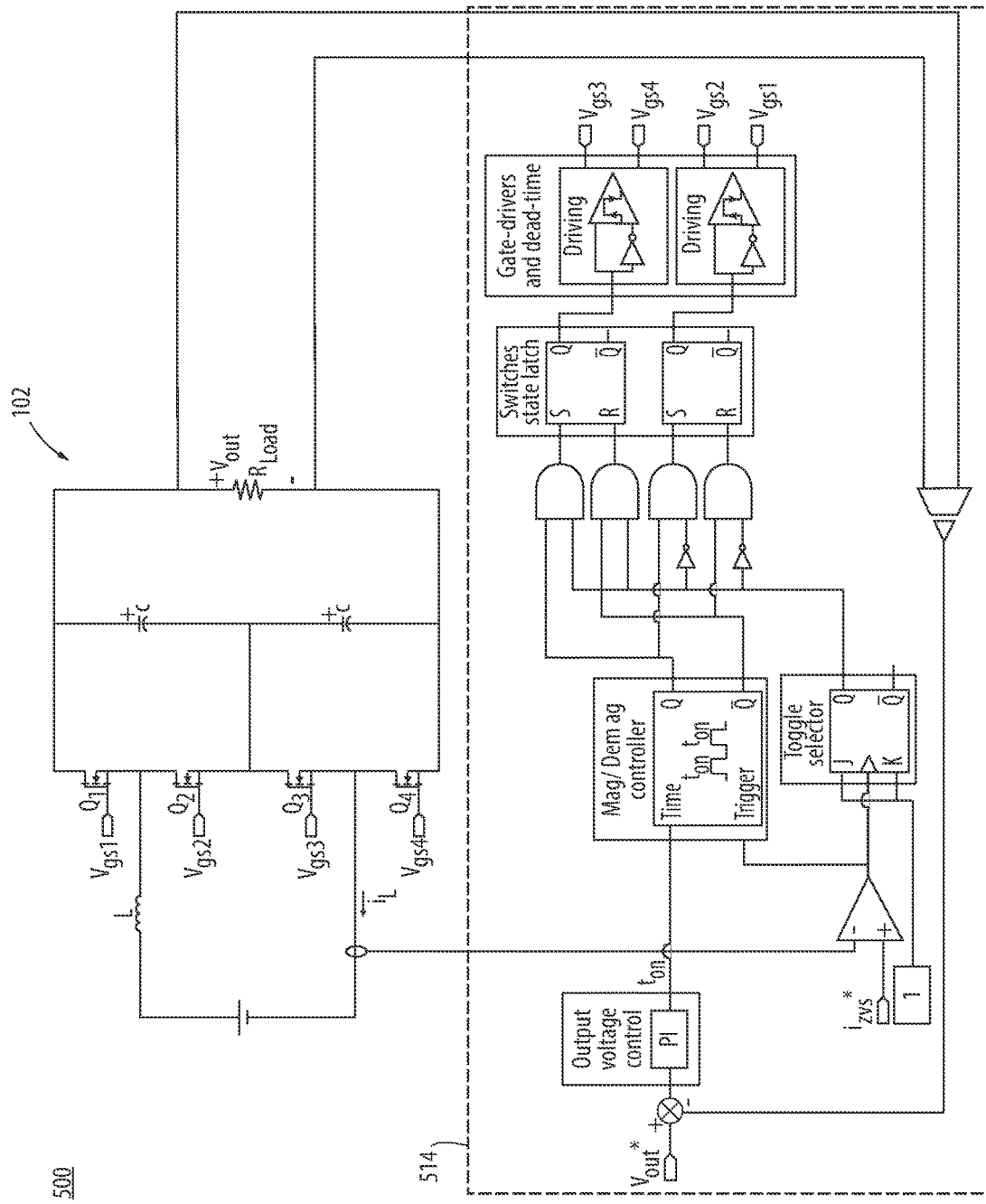
FIG. 10 is a schematic diagrammatic view of another converter system constructed in accordance with at least one aspect of this disclosure, showing another embodiment of a logic module configured to control switching in the converter system.

In accordance with another aspect of this disclosure, as shown in FIG. 10, a system 500 can include similar components as in system 100. For brevity, the description of common elements that have been described above are not repeated with respect to FIG. 10. The system 500 aims to adapt the methods 200, 300, while fixing a required t-on by the control loop and allowing variable time t-off according to the ZVS current measurement, e.g. using the logic module 514. For example, in this embodiment, the bidirectional three-level boost converter 102 employs QSW t-on control and toggle/latching switch states.

As provided herein, embodiments can be used to reduce volume, weight, cost and component count of electrical converters, particularly in aircraft systems. Embodiments offer a great improvement in the overall inductor design over traditional boost converters, for example providing soft-switching and high-frequency operation without extra circuitry. In embodiments, the systems and methods can have a simple design and implementation so that both analog and digital control may be used. Embodiments can improve the power density and specific power of a connected dc-dc converter. In certain embodiments, the reduced number of heat sources, and reduced intensity of those heat sources, can minimize the necessary cooling systems as compared to other ZVS solutions.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may utilize assembly code, including but not limited to MIPS, ARM, Intel x86, and/or RISC-V. Embodiments can include processors such as FPGAs and both VHDL and Verilog. In embodiments, program code can be normally executed in the controller and/or processor, however it is possible in certain embodiments the code is executed on the computer (e.g. testing). In embodiments, the controller and/or processor can be part of a network or communication ring. Embodiments can implement such communication protocols such as, CAN bus, Serial Communication Interface (SCI), or UART could be used. Embodiments may use other communication protocols such as SNMP.

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A converter system for a three-level boost converter, comprising:
a voltage input configured to connect to a voltage source;
a switching module operatively connected to the voltage input and configured to output an output signal;
a voltage output configured to supply voltage to a load; and
a logic module operatively connected to control the switching module to modulate voltage from the voltage source to the voltage output and to maintain a zero-voltage switching condition in the switching module for at least a specified interval,
wherein the logic module includes a comparator operatively connected to a second line of the voltage input and configured to receive a signal indicative of current through the second line,
wherein the comparator is operative to take a difference of an actual current in the second line to a desired current to achieve the zero-voltage switching condition; and
wherein the logic module is operative to control a switching frequency of the switching module based at least in part on the difference of the actual current in the second line and the desired current to achieve the zero-voltage switching condition.

2. The system as recited in claim 1, further comprising an input line connecting between the voltage input and the switching module, an output line connecting between the switching module and the voltage output, and an inductor disposed in a first line of the voltage input.

3. The system as recited in claim 2, wherein the switching module further includes a plurality of switches operatively connected to be controlled by the logic module,
wherein a first path is formed from the voltage input through the switching module to the voltage output by a first switch and a fourth switch in a closed state and a second switch and a third switch in an open state,
wherein a second path is formed from the voltage input through the switching module to the voltage output by the second switch and the fourth switch in the closed state and the first switch and the third switch in the open state,
wherein a third path is formed from the voltage input through the switching module to the voltage output by the first switch and the third switch in the closed state and the second switch and the fourth switch in the open state,
wherein a fourth path is formed from the voltage input to the voltage output by the second switch and the third switch in the closed state and the first switch and the fourth switch in the open state such that there is no path formed between the voltage input and the voltage output through the switching module, and
wherein the logic module is configured to flow current through the inductor between the voltage input and the voltage output through at least one of the first path, the second path, the third path, or the fourth path.

4. The system as recited in claim 3, wherein the logic module further includes an output voltage controller operatively connected to the voltage output and configured to receive a signal indicative of an output voltage based on a load condition, and
wherein the output voltage controller is operative to:
take a difference of an actual output voltage and a desired output voltage; and
control a duty cycle of the switching module based at least in part on the difference of the actual output voltage and the desired output voltage to adjust the output voltage towards the desired output voltage for the load condition.

5. The system as recited in claim 4, wherein the logic module further includes a controllable carrier frequency module operatively connected to a fixed switch frequency controller configured to receive a switching frequency control signal indicative of a switching frequency,
wherein the controllable carrier frequency module is operative to output a carrier at a desired switching frequency to a negative terminal of a first op amp and a negative terminal of a second op amp;
wherein the output voltage controller is operative to output an output voltage control signal to a positive terminal of the first op amp and a positive terminal of the second op amp; and
wherein the first op amp and the second op amp are configured to:
adjust a switching frequency of the switching module until the difference of the actual current in the second line and the desired current to achieve the zero-voltage switching condition is zero; and
adjust a duty cycle of the switching module until the difference of the actual output voltage and the desired output voltage is zero.

6. The system as recited in claim 5, wherein the logic module further includes a gate driving module operatively connected to the first and second op amps, wherein the gate driving module includes:
a first gate driver operatively connected to the first op amp and configured to control the third switch and the fourth switch based at least in part on the switching frequency control signal and the output voltage control signal; and
a second gate driver operatively connected to the second op amp and configured to control the first switch and the second switch based at least in part on the switching frequency control signal and the output voltage control signal.

7. The system as recited in claim 6, wherein the logic module is configured to directly adjust a peak value of a fixed frequency counter of the comparator.

8. The system as recited in claim 3, wherein a carrier of the second switch and a carrier of the third switch are 180 degrees out of phase.

9. The system as recited in claim 2, further comprising a capacitor operatively connected between a first line and a second line of the voltage output.

10. The system as recited in claim 1, further comprising machine readable instructions configured to cause the logic module to:
form a first path from the voltage input through the switching module to the voltage output;
form a second path from the voltage input through the switching module to the voltage output, the second path being different than the first path, wherein a duty cycle for the first path is less than 0.5, and wherein a duty cycle for the second path is greater than 0.5;
adjust a switching frequency of the switching module as a function of a load draw condition; and
impose a dead-time to ensure zero-voltage switching is maintained for the specified interval.

11. The system as recited in claim 10, wherein an input current into the switching module is zero at a beginning of the duty cycle.

12. A method of operating a three-level boost converter, comprising:
    maintaining a zero-voltage switching condition for the converter at zero current for at least a specified interval;
    placing a second switch and a fourth switch into a closed state;
    flowing current through an inductor in a path formed by the second and fourth switches, wherein flowing the current through the inductor includes magnetizing the inductor such that a magnetizing slope is (Vin-Vout)/2;
    placing the second switch and a third switch into an open state;
    placing a first switch and the fourth switch into the closed state;
    demagnetizing the inductor through a path formed by the first and fourth switches such that a demagnetizing slope is Vin-Vout;
    placing the fourth switch into the open state when current through the inductor reaches a minimum required value to place the third switch into a zero-voltage switch mode; and
    imposing a dead-time to ensure zero-voltage switching is maintained for the specified interval.

13. The method as recited in claim 12, further comprising:
    placing the first switch and the third switch into the closed state;
    magnetizing the inductor through a path formed by the first and third switches such that the magnetizing slope is (Vin-Vout)/2; and
    placing the third switch into the open state.

14. The method as recited in claim 13, further comprising:
    placing the first switch into the open state when the current flowing through the inductor reaches a minimum required value to place the second switch into a zero-voltage switch mode;
    imposing the dead-time to ensure zero-voltage switching is maintained for the specified interval;
    placing the second switch and the fourth switch into the closed state; and
    magnetizing the inductor through a path formed by the second and fourth switches such that the magnetizing slope is (Vin-Vout)/2.

15. The method as recited in claim 12, wherein flowing the current through the inductor includes demagnetizing the inductor through a path formed by the second and fourth switches such that the demagnetizing slope is (Vin-Vout)/2.

16. The method as recited in claim 15, further comprising:
    placing the second switch and the third switch into the closed state;
    magnetizing the inductor through a path formed by the second switch and the third switch such that the magnetizing slope is Vin;
    placing the second switch into the open state;
    placing the first switch and the third switch into the closed state;
    demagnetizing the inductor through a path formed by the first and third switches such that the demagnetizing slope is (Vin-Vout)/2; and
    placing the first switch into the open state when current flowing through the inductor reaches a minimum required value to place the second switch into a zero-voltage switching mode.

17. The method as recited in claim 16, further comprising:
    placing the second switch and the third switch into the closed state;
    magnetizing the inductor through a path formed by the second and third switches such that the magnetizing slope is Vin;
    placing the third switch into the open state;
    placing the second switch and the fourth switch into the closed state; and
    demagnetizing the inductor through a path formed by the second and fourth switches such that the demagnetizing slope is (Vin-Vout)/2.

* * * * *